(12) United States Patent
Faigle et al.

(10) Patent No.: US 6,405,607 B2
(45) Date of Patent: Jun. 18, 2002

(54) VEHICLE SEAT BELT TENSION AND SEAT WEIGHT APPARATUS

(75) Inventors: Ernst M. Faigle, Dryden; Tracy S. Sparks, Attica; Douglas P. Campbell, Metamora; Craig J. Lyszczyk, Casco, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/811,877

(22) Filed: Mar. 19, 2001

Related U.S. Application Data

(63) Continuation-in-part of application No. 09/602,181, filed on Jun. 22, 2000.

(51) Int. Cl.[7] ................................................. G01L 5/04
(52) U.S. Cl. ............................. 73/862.391; 73/862.381
(58) Field of Search ..................... 73/862.451, 862.474, 73/862.391, 862.381, 862.634

(56) References Cited

U.S. PATENT DOCUMENTS

| 3,737,849 A | 6/1973 | Mead |
| 3,817,093 A | 6/1974 | Williams |
| 3,995,247 A | * 11/1976 | Kurtz ........................... 338/43 |
| 5,707,077 A | 1/1998 | Yokota et al. |
| 5,971,432 A | 10/1999 | Gagnon et al. |
| 5,996,421 A | 12/1999 | Husby |
| 6,081,759 A | * 6/2000 | Husby et al. ................. 701/45 |

* cited by examiner

Primary Examiner—Max Noori
Assistant Examiner—Andre Allen
(74) Attorney, Agent, or Firm—Tarolli, Sundheim, Covell, Tummino & Szabo L.L.P.

(57) ABSTRACT

An apparatus (10) includes a member (14) that has a first slot (30) extending through the member within the periphery (32) of the member. The first slot (30) has opposed spaced surfaces (34) that define a gap (40) that has a width measured from one of the opposed surfaces to the other of the opposed surfaces. The member (14) includes first and second portions (42 and 44) positioned on opposite sides of the first slot (30). The apparatus (10) also includes a sensor (16) that has a first end (100) connected to the first portion (42) on one side of the first slot (30) and an opposite second end (102) connected to the second portion (44) on an opposite side of the first slot such that the sensor extends across the first slot. The apparatus (10) further includes a fastener (20) for fixedly connecting the second portion (44) to inhibit movement of the second portion of the member relative to the first portion (42). The first portion (42) moves relative to the second portion (44) when a force is applied to the first portion, which causes the width of the gap to change. The sensor (16) provides a signal in response to the change in the gap width.

34 Claims, 10 Drawing Sheets

VEHICLE SEAT BELT TENSION AND SEAT WEIGHT APPARATUS

RELATED APPLICATION

This application is a continuation-in-part of U.S. patent application Ser. No. 09/602,181, filed Jun. 22, 2000.

FIELD OF THE INVENTION

The present invention relates to a sensor apparatus.

BACKGROUND OF THE INVENTION

It is known to use a sensor apparatus in conjunction with an inflatable vehicle occupant protection device for helping to protect an occupant of a vehicle. The sensor apparatus provides information to a controller that controls the inflation of the inflatable vehicle occupant protection device in accordance with conditions sensed by the sensor apparatus.

SUMMARY OF THE INVENTION

In accordance with the present invention, an apparatus includes a member that has a first slot extending through the member within the periphery of the member. The first slot has opposed spaced surfaces that define a gap that has a width measured from one of the opposed surfaces to the other of the opposed surfaces. The member includes first and second portions positioned on opposite sides of the first slot. The apparatus also includes a sensor that has a first end connected to the first portion on one side of the first slot and an opposite second end connected to the second portion on an opposite side of the first slot such that the sensor extends across the first slot. The apparatus further includes means for fixedly connecting the second portion to inhibit movement of the second portion of the member relative to the first portion. The first portion moves relative to the second portion when a force is applied to the first portion, which causes the width of the gap to change. The sensor provides a signal in response to the change in the gap width.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE PREFERRED EMBODIMENTS

Figure 1:
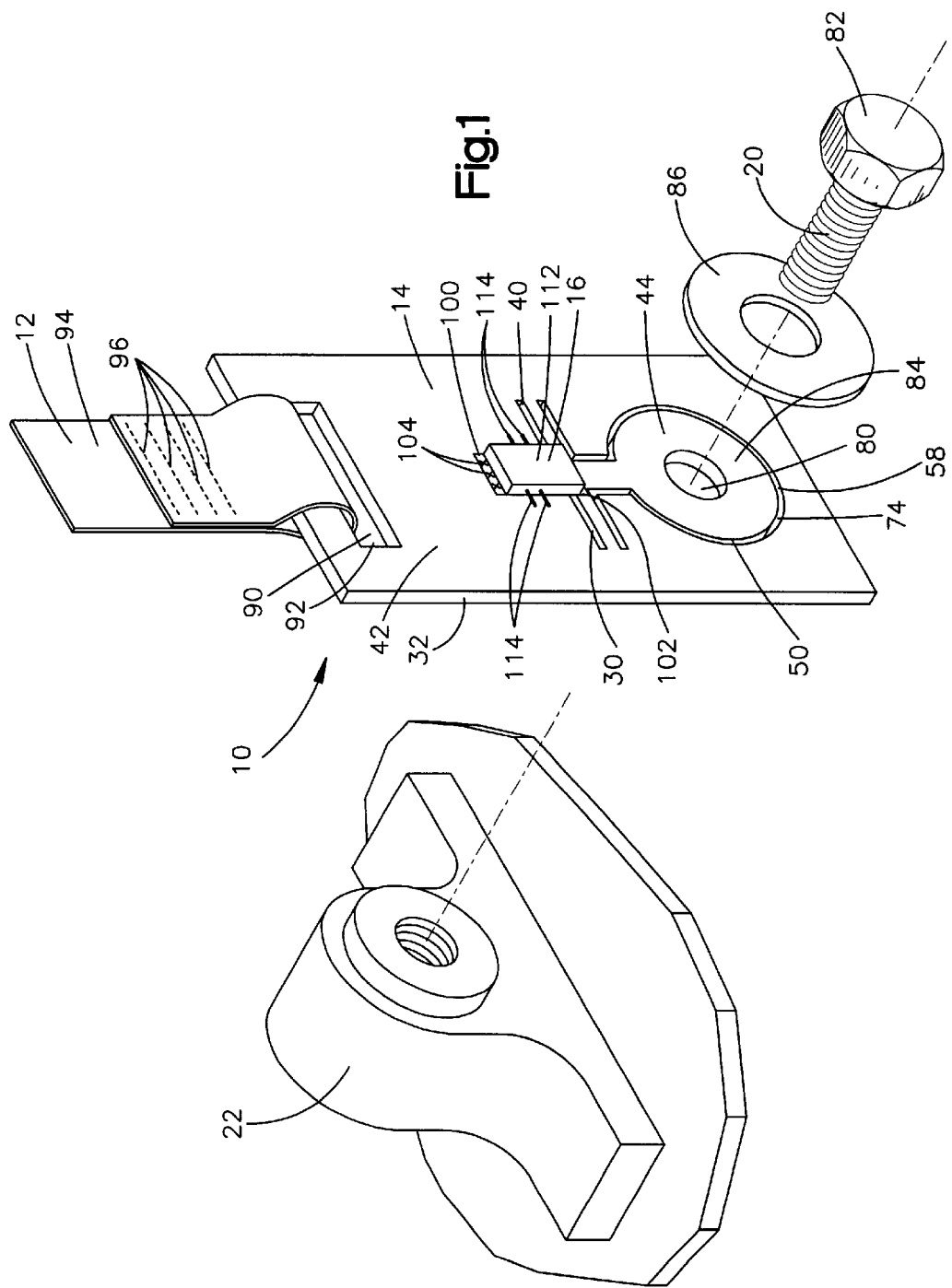
FIG. 1 is a perspective view of a sensor apparatus in accordance with a first embodiment of the present invention.
Figure 2:
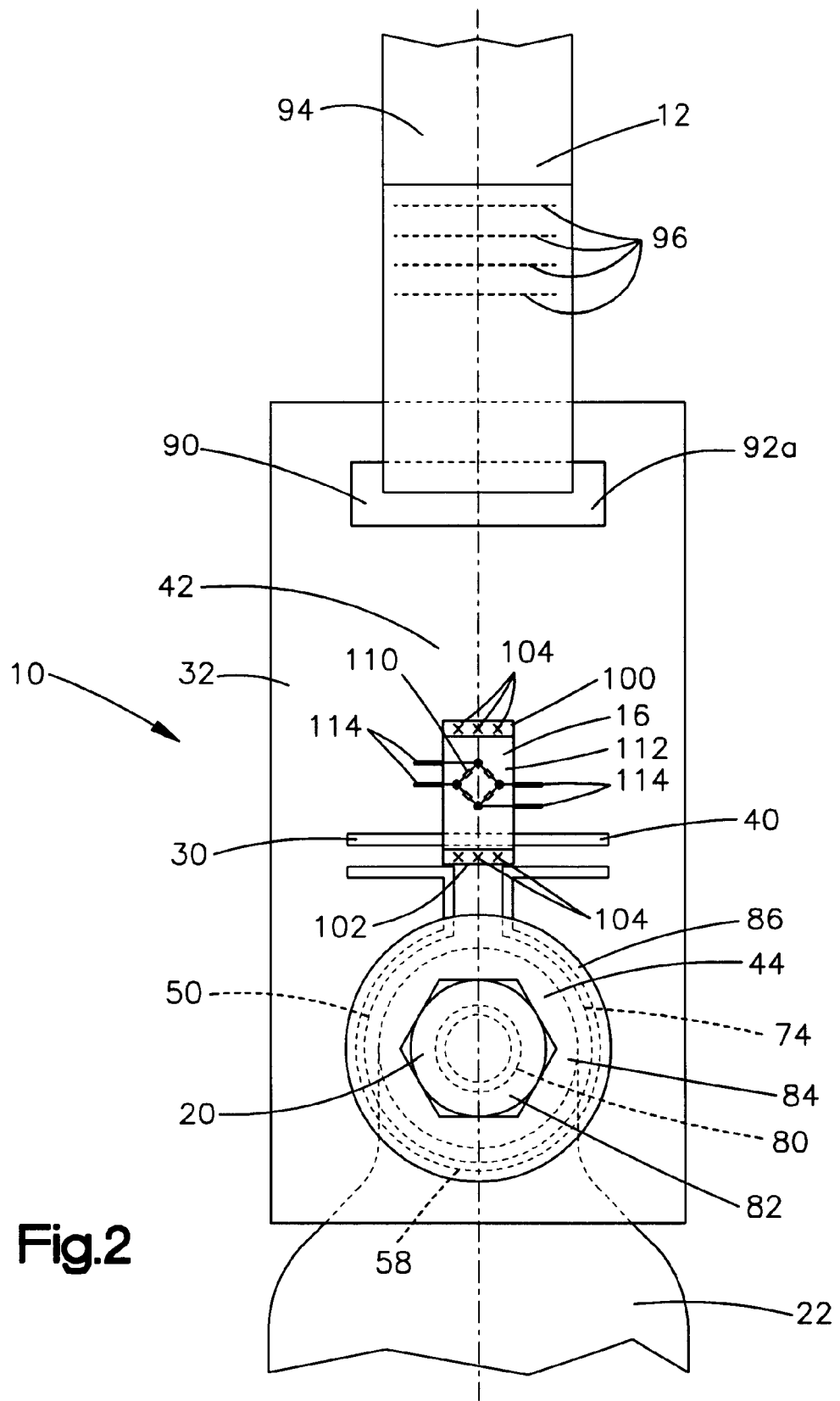
FIG. 2 is a schematic view of the apparatus of FIG. 1.

The present invention relates to a sensor apparatus 10. As illustrated in FIGS. 1 and 2, the apparatus 10 comprises a member 14, a sensor 16 connected to the member, and means, such as a fastener 20, for fixedly connecting a portion of the member to a structure 22. Those skilled in the art, however, will recognize that any suitable means, such as a weld or an adhesive, may be used to fixedly connect the portion of the member 14 to the structure 22.

In the embodiment illustrated in FIGS. 1 and 2, the member 14 is illustrated as having a generally rectangular overall shape. The rectangular shape of the member 14, however, is for illustrative purposes only, and it should be understood that the member 14 may have alternative shapes in order to accommodate particular application in which use of the apparatus 10 is desired.

The member 14 includes a first slot 30 that extends through the member within a periphery 32 of the member. The first slot 30 (FIG. 3) includes opposed spaced surfaces 34 and opposite ends 36. The surfaces 34 extend generally parallel to each other and define a gap 40. The gap 40 has a width measured from one of the opposed surfaces 34 to the other.

The first slot 30 helps to define first and second portions 42 and 44, respectively, of the member 14 on opposite sides of the first slot. The second portion 44 of the member 14 is further defined by a second slot 50 (FIGS. 1–3) that is spaced apart from the first slot 30 within the periphery 32 of the member. The second slot 50 (FIG. 3) includes opposed spaced surfaces 52 and first and second opposite end portions 54 and 56, respectively. The first and second end portions 54 and 56 extend parallel to the first slot 30 and have respective terminal ends 60 and 62 that are vertically aligned with respective ends 36 of the first slot.

Figure 2A:
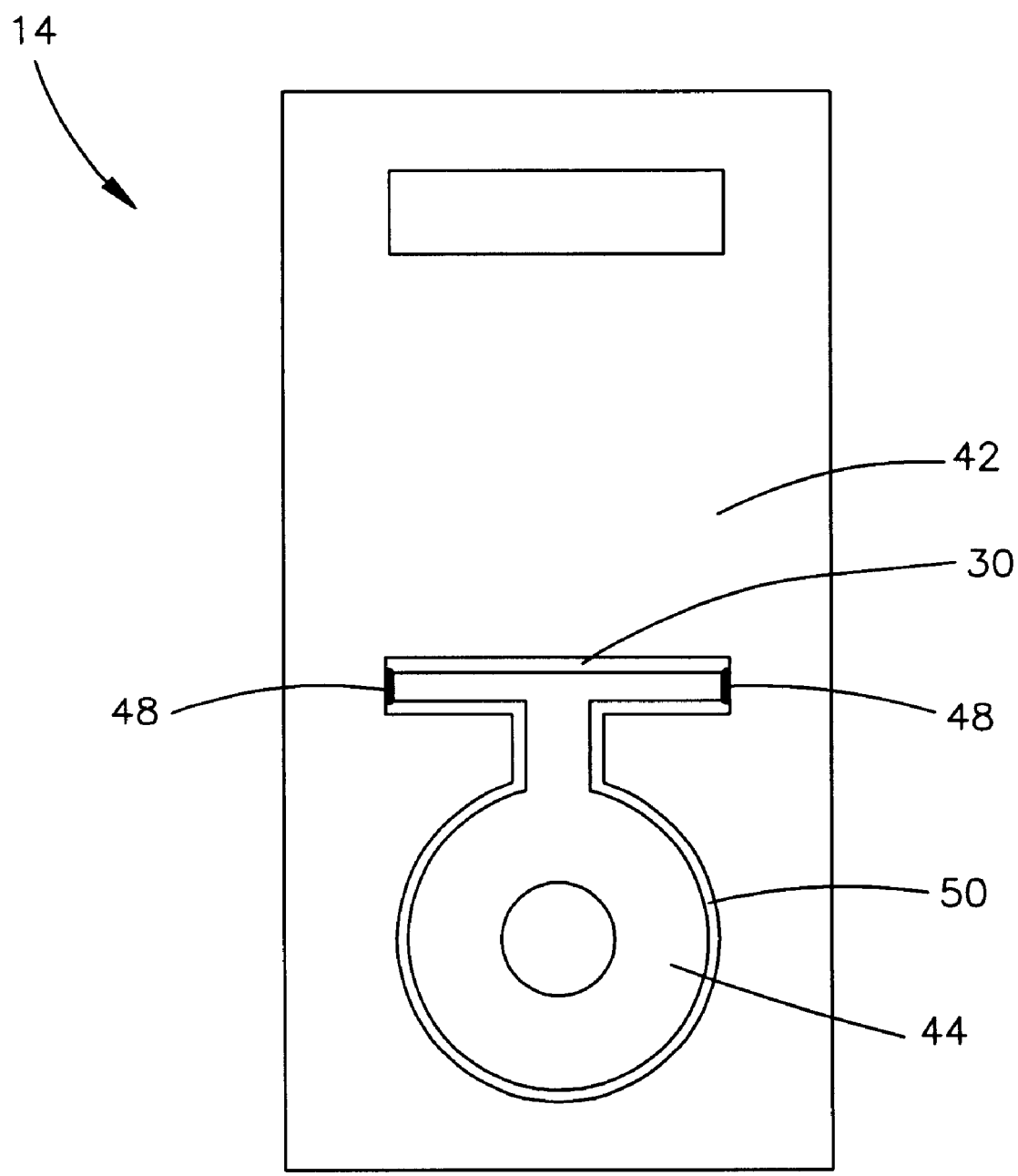

Preferably, the member 14 is constructed of a single piece of material, such as metal. Those skilled in the art, however, will recognize that the member 14 may have alternative constructions. For example, the first and second portions 42 and 44 could be constructed of two or more separate pieces of material. This is illustrated in FIG. 2a. In this instance, the first and second portions 42 and 44 are fixedly joined by means 48, such as welding or adhesives, adjacent or near the ends of the first and second slots 30 and 50.

A first middle portion 70 of the second slot 50 extends from the first end portion 54 in a direction perpendicular to the first end portion and away from the first slot 30. The first middle portion 70 extends from the first end portion 54 at a location opposite the terminal end 60 of the first end portion.

A second middle portion 72 of the second slot 50 extends from the second end portion 56 in a direction perpendicular to the first end portion and away from the first slot 30. The second middle portion 72 extends from the second end portion 56 at a location opposite the terminal end 62 of the second end portion. The second middle portion 72 is parallel to and spaced from the first middle portion 70.

Figure 3:
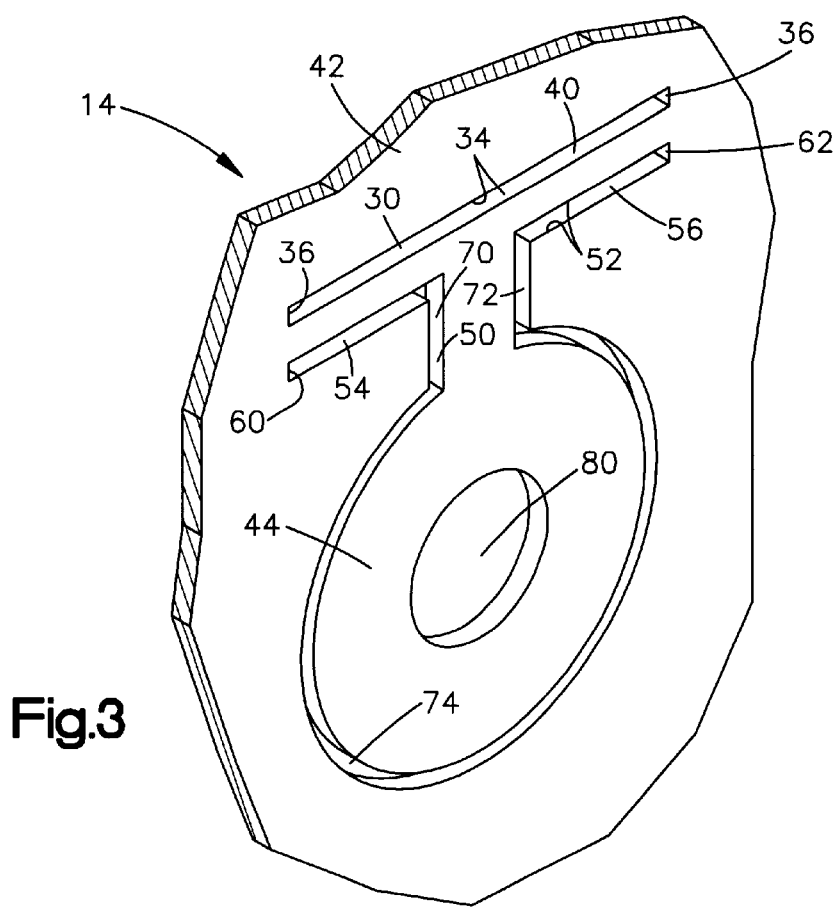
FIG. 3 is an enlarged perspective view of a portion of the apparatus of FIG. 1.

An arc-shaped portion 74 of the second slot 50 extends along an arc-shaped path from the first middle portion 70 to the second middle portion 72. As illustrated in FIG. 3, the radius of the arc-shaped portion 74 is equal to approximately one-half of the length of the first slot 30.

The member 14 (FIGS. 1–3) also includes an aperture 80 that extends through the second portion 44 of the member. The aperture 80 has a circular shape and is partially surrounded by the arc-shaped portion 74 of the second slot 50. The arc-shaped portion 74 and the aperture 80 may be concentric. The fastener 20 (FIGS. 1 and 2) is extendable through the aperture 80 to connect the second portion 44 fixedly to the structure 22.

The fastener 20 and a washer 86 cooperate to connect the second portion 44 of the member 14 to the structure 22. The washer 86 is positioned between a head portion 82 of the fastener and a surface 84 of the second portion 44 of the member 14. The washer 86 has a diameter large enough to overlie and extend across the second slot 50. This helps to prevent to second portion 44 from bending relative to the first portion 42, tearing away from the first portion, or otherwise failing under high tension loads.

The member 14 also includes means 90 for connecting the first portion 42 of the member to an object 12. In the embodiment illustrated in FIGS. 1 and 2, the means 90 comprises an aperture 92 and the object 12 comprises a flexible elongated member 94. The flexible elongated member 94 extends through the aperture 92, is folded over and connected to itself by means 96, such as stitching, so as to connect the flexible elongated member to the first portion 42 of the member 14. It will be recognized by those skilled in the art that the means 90 and the object 12 may have alternative configurations. For example, the means 90 may comprise any suitable connector, such as a hook, ring, fastener, weld, or adhesive, and the object 12 may comprise any desired article.

The sensor 16 has a first end 100 connected to the first portion 42 of the member 14 and an opposite second end 102 connected to the second portion 44 of the member. The first and second ends 100 and 102 are connected to the member 14 on opposite sides of the first slot 30 such that the sensor 16 extends across the first slot. The first and second ends 100 and 102 of the sensor 16 are preferably connected to the member 14 by spot welds 104 to connect the sensor fixedly and rigidly to the member. The sensor 16 may, however, be connected to the member 14 by alternative methods, such as by fasteners or adhesive bonding.

In the embodiment illustrated in FIGS. 1–3, the sensor 16 preferably comprises a strain gauge device 110 (FIG. 2) in the form of known electrical resistance wire strain gauges. The wire strain gauges are preferably wired in a Wheatstone bridge circuit, in a known manner, in order to cancel out the effects of temperature on the wire strain gauges.

The strain gauge device 110 is encapsulated in a protective material 112 (FIGS. 1 and 2), such as plastic or polyurethane, in order to isolate and protect the gauge from environmental conditions. The sensor 16 includes leads 114 that protrude from the protective material 112. In the embodiment illustrated in FIGS. 1 and 2, the sensor 16 includes four leads 114. This is because the strain gauge is wired in a Wheatstone bridge circuit. Two of the leads 114 are used to apply a voltage across the bridge, and the other two leads are used to measure voltage potential across the bridge indicative of the amount of strain sensed by the strain gauge.

When a force is applied to the first portion 42 of the member 14, such as by the object 12, the force causes the first portion 42 of the member 14 to move relative to the second portion 44. This is because the second portion 44 is fixedly connected to the structure 22 by the fastener 20, whereas the first portion 42 is not fixedly connected directly to the structure. The member 14 is oriented such that the force causes the first and second portions 42 and 44 to move relative to each other.

If the force acts to move the first and second portions 42 and 44 away from each other across the gap 40, the width of the gap 40 increases a given distance depending upon the magnitude of the force applied to the member 14. Also, as the first and second portions 42 and 44 move away from each other across the gap 40, the first and second portions may move towards each other across the second slot 50 at or near a location, indicated generally at 58, positioned opposite the first slot 30. If the magnitude of the force is large enough, the first and second portions 42 and 44 may even move into abutting engagement with each other at the location 58 on the second slot.

As the first and second portions 42 and 44 move away from each other, the sensor 16 is stretched a distance equal to the distance that the width of the gap 40 increases. The distance that the width of the gap 40 increases and the sensor 16 is stretched is extremely small, and may be as little as a few millionths of an inch or less. As the sensor 16 is stretched and the strain gauge 110 (FIG. 2) is stretched, the electrical resistance of the gauge changes in proportion to the change in gap width.

The change in resistance of the strain gauge results in a change in voltage potential measured across the bridge circuit. The change in resistance, being proportional to the change in the width of the gap 40 caused by the force applied to the member 14, is also proportional to the amount of tension on the member 14 acting to move the first and second portions 42 and 44 apart. Thus, the change in voltage potential measured across the bridge can be used to calculate the amount of tension on the member 14. The tension may be calculated by known means, such as a microcomputer, and used for a desired purpose, such as for providing data to a controller.

The apparatus 10 has been described in an application where a force causes the first and second portions 42 and 44 of the member 14 to move away from each other across the gap 40. It will be recognized by those skilled in the art, however, that the apparatus 10 may also be used in an application where a force causes the first and second portions 42 and 44 to move towards each other across the gap 40. For example, the apparatus 10 may be used to sense compression. In such an instance, the width of the gap 40 would decrease as the first and second portions 42 and 44 move towards each other. The sensor 16, and thus the strain gauge 110, would be compressed a distance generally equal to the distance the gap width decreases. This would cause the resistance of the strain gauge 110 to change in proportion to the distance that the gap width decreases. This change in resistance would cause a change in voltage potential measured across the bridge, which could be used to calculate the compressive force acting on the member 14. Compressing the gap 40 may also help to increase the load carrying capability of the member 14.

Figure 6:
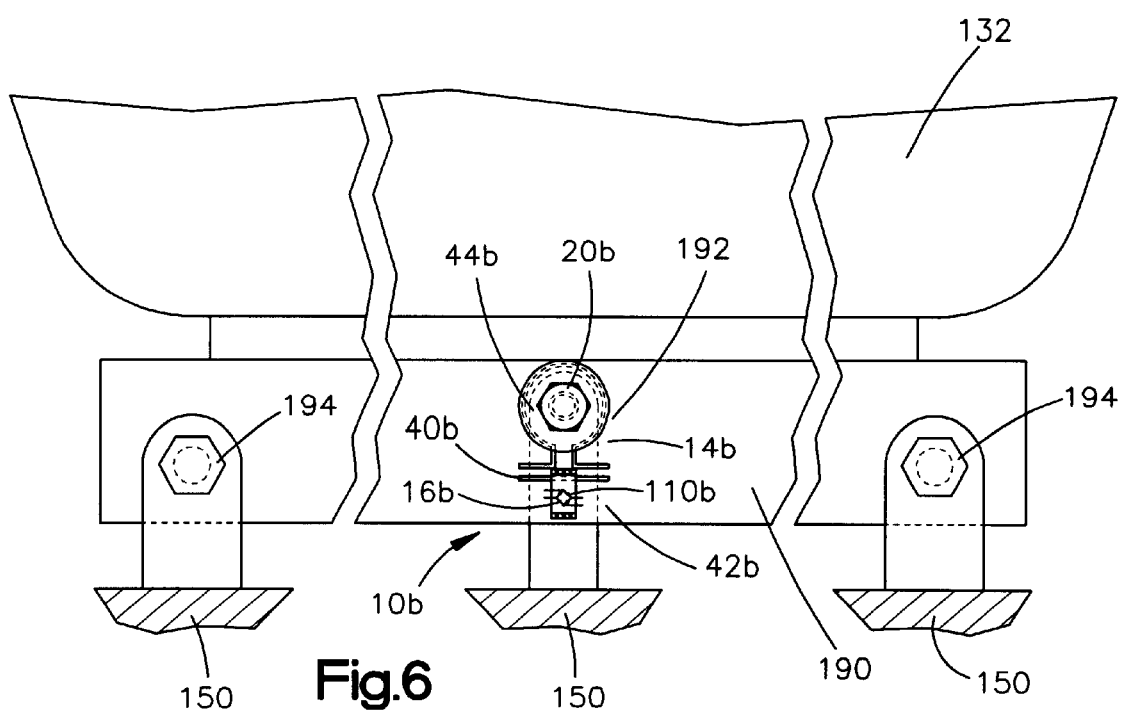
FIG. 6 is an enlarged schematic view of another portion of the vehicle illustrated in FIG. 4 depicting another preferred use of the apparatus of FIG. 1.
Figure 4:
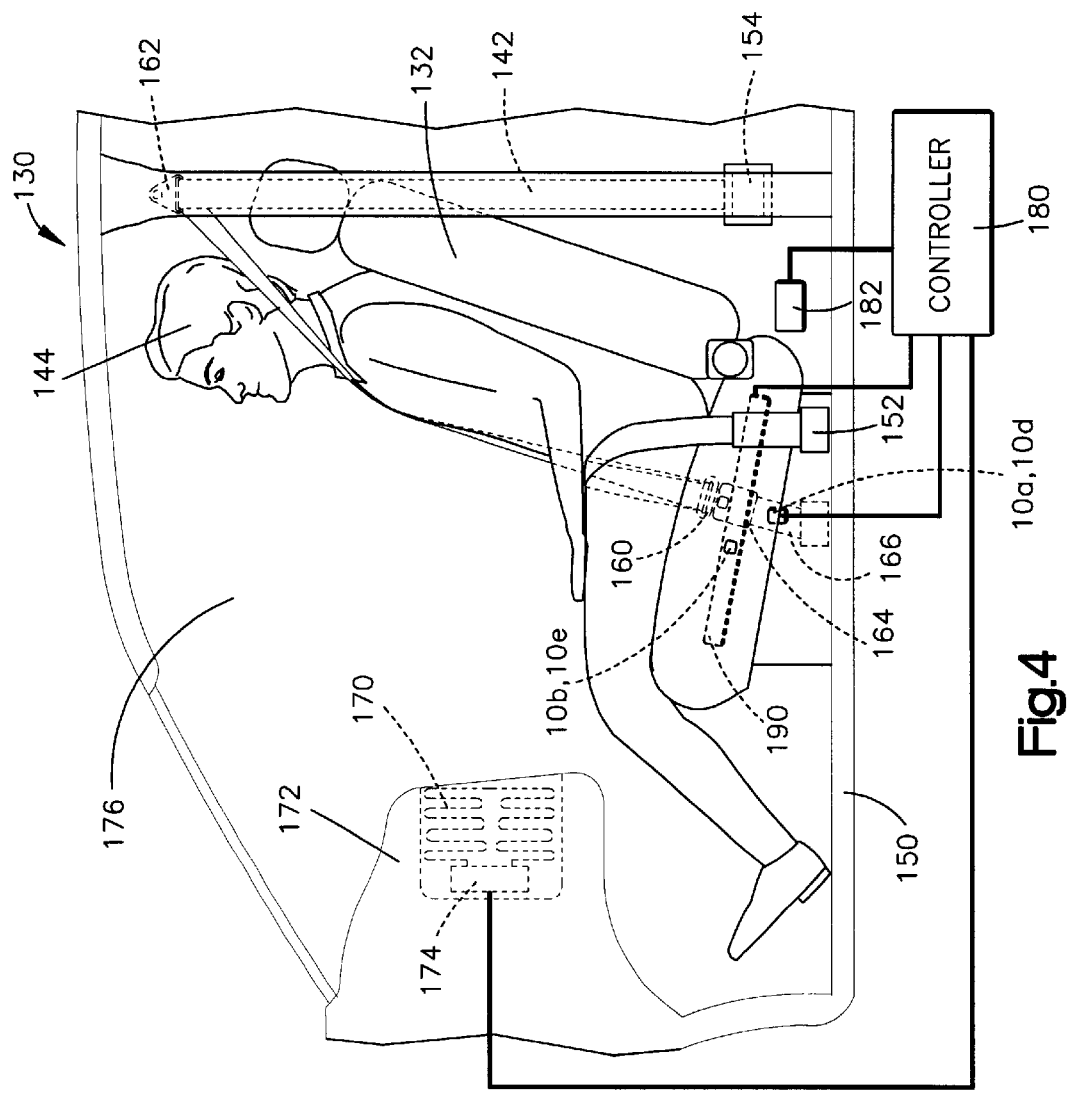
FIG. 4 is a schematic illustration of the apparatus of FIG. 1 depicting preferred uses of the apparatus in a vehicle.
Figure 5:
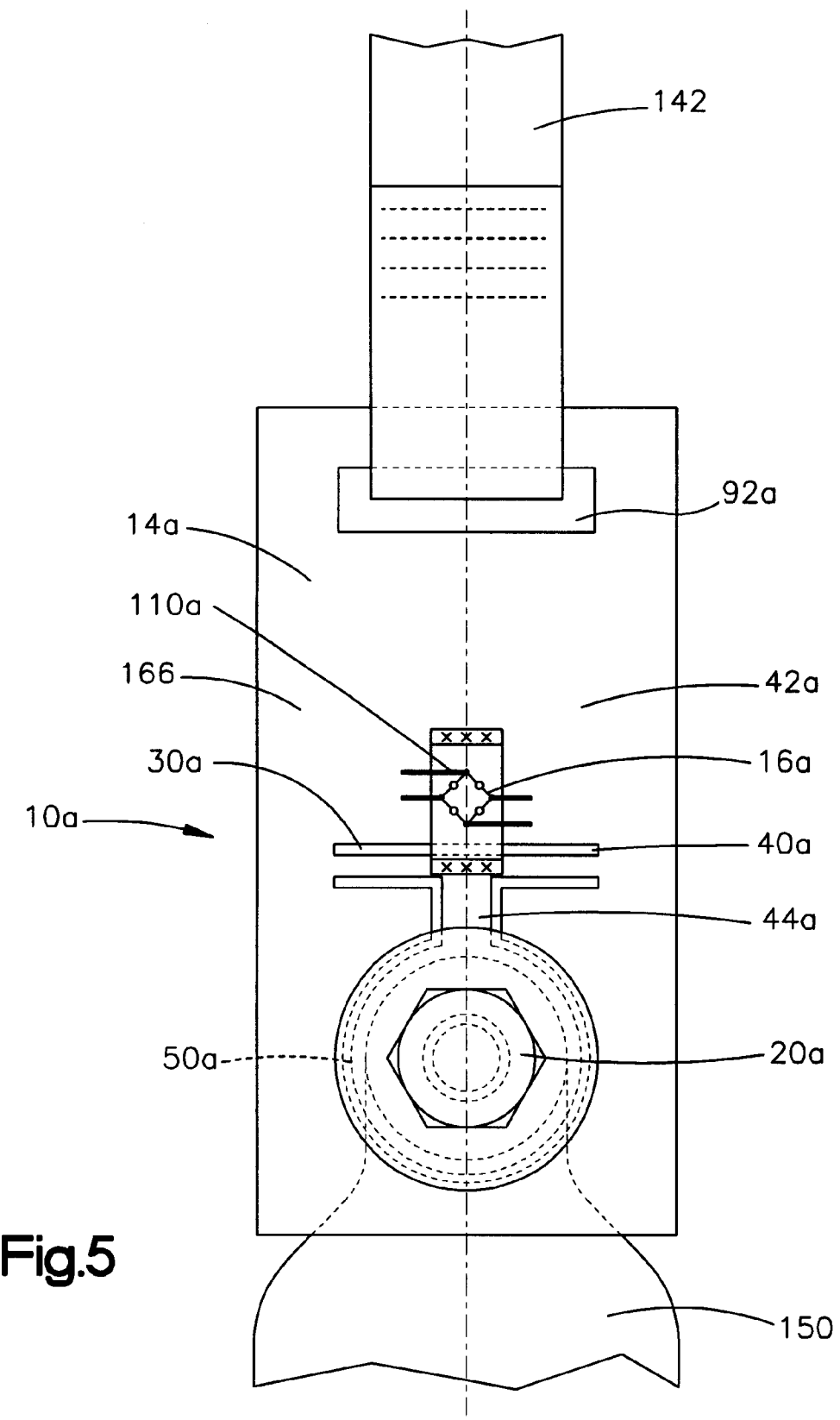
FIG. 5 is an enlarged schematic view of a portion of the vehicle illustrated in FIG. 4 depicting a preferred use of the apparatus of FIG. 1.

Illustrative of preferred uses of the first embodiment of the present invention, FIGS. 4–6 depict first and second apparatuses 10*a* and 10*b*, respectively, incorporated in a vehicle 130. The vehicle 130 (FIG. 4) includes a seat 132 and a restraint system comprising a seat belt 142 for restraining a vehicle occupant 144, in the seat. It will be recognized by those skilled in the art, however, that an alternative object, such as a child safety seat (not shown in FIGS. 4–6), may also be supported by the vehicle seat 132 and restrained by the restraint system.

A length of the seat belt 142 is extensible about the vehicle occupant 144. One end of the seat belt 142 is anchored to the vehicle body 150 at an anchor point 152 located on one side of the seat 132. The opposite end of the seat belt 142 is attached to a retractor 154, which is usually secured to the vehicle body 150 on the same side of the seat 132 as the anchor point 152.

As shown in FIG. 4, intermediate its ends, the seat belt 142 passes through a tongue assembly 160 and a D-ring 162 that is located above the retractor 154 and the anchor point 152. When the seat belt 142 is not in use, the seat belt is wound on the retractor 154, as known in the art. To use the seat belt 142, the tongue assembly 160 is moved across the seat 132 and connected with a buckle 164. The buckle 164 is connected to the vehicle body 150, on a side of the seat 132 opposite the anchor point 152, by an anchor plate 166.

An inflatable vehicle occupant protection device, such as an air bag 170, is stored in a folded condition in a portion of the vehicle 130, such as a steering wheel (not shown) on the driver side of the vehicle or an instrument panel 172 of the vehicle on the passenger side of the vehicle. When the vehicle 130 experiences a crash in which it is desirable to inflate the air bag, an inflator 174 is actuated and provides inflation fluid for inflating the inflatable occupant protection device. The inflation fluid is directed into the air bag and inflates the air bag from the folded condition to an inflated condition in which the air bag extends into an occupant compartment 176. The inflated air bag 170 helps protect the occupant 144 from a forceful impact with parts of the vehicle 130.

An electronic controller 180, such as a microcomputer, is operatively connected to a vehicle crash sensor 182 (shown schematically in FIG. 4), which senses the occurrence of a vehicle crash. The controller 180 is also connected to the first and second apparatuses 10a and 10b and the inflator 174. Once the controller 180 determines that a crash is occurring for which inflation of the air bag 170 is necessary to help protect the occupant 144 of the seat 132, the controller actuates the inflator 174. This actuation of the inflator 174 is done in accordance with information provided to the controller by the first and second apparatuses 10a and 10b.

As illustrated in FIG. 4, the first apparatus 10a is incorporated into the anchor plate 166 for the seat belt 142. The apparatus 10a illustrated in FIGS. 4 and 5 is similar to the apparatus 10 illustrated in FIGS. 1–3. Accordingly, numerals similar to those of FIGS. 1–3 will be utilized in FIGS. 4 and 5 to identify similar components, the suffix letter "a" being associated with the numerals of FIGS. 4 and 5 to avoid confusion. The apparatus 10a (FIGS. 4 and 5) is identical to the apparatus 10 (FIGS. 1–3), except that the apparatus 10a (FIGS. 4 and 5) is used to sense tension in the seat belt 142 of a vehicle 130.

As illustrated in FIG. 5, the member 14a of the apparatus 10a is the anchor plate 166 for connecting the seat belt 142 to the vehicle body 150. The seat belt 142 extends through the aperture 92a to connect the seat belt to the anchor plate 166. The fastener 20a fixedly connects the second portion 44a of the member 14a, i.e., the anchor plate 166, to the vehicle body 150.

When the seat belt 142 is tensioned, a force is applied to the first portion 42a of the anchor plate 166 in the direction and of the magnitude of the tension. The force causes the first portion 42a of the anchor plate 166 to move relative to the second portion 44a of the anchor plate because the second portion is fixedly connected to the vehicle body 150 by the fastener 20a. The anchor plate 166 is oriented such that the force causes the first and second portions 42a and 44a move away from each other across the gap 40a.

As the first and second portions 42a and 44a move away from each other, the width of the gap 40a increases a given distance depending upon the magnitude of the force applied to the anchor plate 166 by the seat belt 142. Also, as the first and second portions 42a and 44a move away from each other, the sensor 16a, and thus the strain gauge device 110, is stretched a distance equal to the distance that the width of the gap 40a increases. As the sensor 16a is stretched, the controller 180 (FIG. 4) calculates the amount of tension on the anchor plate 166, and thus the seat belt 142, based upon the signal received from the sensor 16a.

Advantageously, the inclusion of the apparatus 10a in the anchor plate 166 provides for the sensing of a relatively low amount of tension in the seat belt 142, under 100 pounds, while maintaining a high tensile strength in the anchor plate. The anchor plate 166 is preferably able to withstand tensions greater than three thousand pounds. This combination of high resolution tension sensing capability and high tensile strength is due to the incorporation of the first and second slots 30a and 50a. The first and second slots 30a and 50a allow the first and second portions 42a and 44a to move relative to each other to provide high resolution tension sensing, while maintaining the one-piece construction of the anchor plate 166, which provides a high tensile strength. Also, placing the sensor 16a on the anchor plate 166 near the floor of the vehicle facilitates covering the sensor with a protective device, such as a boot, to help keep dirt, etc. out of the gap 40a.

As illustrated in FIG. 4, the second apparatus 10b is incorporated into the seat frame 190 of the vehicle seat 132. The apparatus 10b illustrated in FIGS. 4 and 6 is similar to the apparatus 10 illustrated in FIGS. 1–3. Accordingly, numerals similar to those of FIGS. 1–3 will be utilized in FIGS. 4 and 6 to identify similar components, the suffix letter "b" being associated with the numerals of FIGS. 4 and 6 to avoid confusion. The apparatus 10b (FIGS. 4 and 6) is identical to the apparatus 10 (FIGS. 1–3), except that the apparatus 10b (FIGS. 4 and 6) is used to sense the weight of an object in the vehicle seat 132.

As illustrated in FIG. 6, the member 14b of the apparatus 10b is incorporated into a portion 192 of the seat frame 190 of the vehicle seat 132. The seat frame 190 is connected to the vehicle body 150 by fasteners 194, such as bolts. The fastener 20b fixedly connects the second portion 44b of the member 14b, i.e., the seat frame 190, to the vehicle body 150.

When the occupant 144 (FIG. 4) is seated in the seat 132, the weight of the occupant applies a force to the first portion 42b (FIG. 6) of the seat frame 190. The force causes the first portion 42b of the seat frame 190 to move relative to the second portion 44b of the seat frame because the second portion is fixedly connected to the vehicle body 150 by the fastener 20b. The apparatus 10b is oriented relative to the seat 132 such that the force causes the first and second portions 42b and 44b move away from each other across the gap 40b.

As the first and second portions 42b and 44b move away from each other, the width of the gap 40b increases a given distance depending upon the magnitude of the force applied to the seat frame 190 by the weight of the occupant 144

(FIG. 4). Also, as the first and second portions 42*b* and 44*b* (FIGS. 4 and 6) move away from each other, the sensor 16*b*, and thus the strain gauge device 110, is stretched a distance equal to the distance that the width of the gap 40*b* increases. As the sensor 16*b* is stretched, the controller 180 (FIG. 4) calculates the weight of the occupant 144 on the seat 132 based upon the signal received from the sensor 16*b*.

The controller 180 controls the amount of inflation fluid directed into the air bag 170 by the inflator 174. The controller determines the amount of inflation fluid directed into the air bag 170 based on the amount of tension on the seat belt 142 sensed by the apparatus 10*a* and the amount of weight supported by the seat frame 190 sensed by the apparatus 10*b*.

During operation of the vehicle, the occupant 144 usually has the tongue 160 connected with the buckle 164. Typically, the amount of tension in the seat belt 142 will be relatively low when the seat belt is used to restrain an occupant 144 seated in the vehicle seat 132. This is because the occupant 144 will typically adjust the seat belt 142 to fit comfortably, rather than tightly, around the occupant's body. If high tension is present, the tension in the seat belt 142 pulls down on the occupant 144, causing the apparatus 10*b* to be subjected to the weight of the occupant 144 along with the downward force resulting from the tension in the seat belt 142. The output signal from the apparatus 10*b* thus indicates a sensed weight of the occupant 144, which may be greater than the actual weight of the occupant.

The apparatus 10*a* senses the tension in the seat belt 142 and provides an output signal to the controller 180 indicating the tension in the seat belt. The apparatus 10*b* senses the sensed weight of the occupant 144 on the vehicle seat 132 and provides an output signal to the controller 180 indicating the sensed weight on the seat. The controller 180 determines a computed weight of the occupant 144 as a function of both the sensed weight and the tension in the seat belt 142. The computed weight approximates the actual weight of the occupant 144. The computed weight may, however, differ slightly from the actual weight of the occupant 144.

The controller 180 controls the amount of inflation fluid directed to the air bag 170 by the inflator 174 based on the computed weight of the occupant 144 in the seat 132. If the computed weight is below a predetermined value or is zero, the controller 180 disables the inflator 174 to prevent inflation fluid from being directed to the air bag 170. Alternatively, if the computed weight is below the predetermined value, the controller 180 may cause the inflator 174 to direct a minimal amount of inflation fluid to the air bag 170.

The controller 180 may have a look-up table that stores a plurality of sensed weight values, a plurality of seat belt tension values, and a plurality of computed weight values corresponding to combinations of the sensed weight values and the seat belt tension values. The computed weight values stored in the look-up table would be empirically determined. The controller 180 would select a predetermined computed weight value from the look-up table by matching the sensed values from the apparatuses 10*a* and 10*b* against the values of sensed weight and seat belt tension stored in the table.

Alternatively, the controller 180 could determine the computed weight by performing a computation based on a predetermined functional relationship between the sensed weight and the amount of tension in the seat belt 142. In either case, the computed weight determined by the controller 180 more closely approximates the actual weight of the occupant 144 than does the sensed weight indicated by the apparatus 10*b*. This is because the effect of the tension in the seat belt 142 is considered in determining the computed weight.

If the present invention is used in a restraint system for restraining a passenger 144 in a vehicle seat 132 on a passenger side of the vehicle 130, the apparatus 10*a* and the apparatus 10*b* may also be used to sense the presence of a low weight object, such as a child safety seat (not shown), in the seat. If a child safety seat is located in the vehicle seat 132, the tongue 160 is connected with the buckle 164 to secure the child safety seat to the seat 132. Typically, the seat belt 142 is pulled as tight as possible to secure the child safety seat to the seat 132. This differs from the instance in which an occupant 144 is seated in the seat 132 and the seat belt 142 is fitted comfortably or loosely around the occupant.

The tension in the seat belt 142 pulls down on the child safety seat and causes the weight sensing apparatus 10*b* to be subjected to the weight of the child safety seat with the child in it and the downward force resulting from the tension in the seat belt. The output signal from the weight sensing apparatus 10*b* thus indicates a sensed weight of the child safety seat with the child in it, which is greater than the actual weight of the child safety seat and the child. The sensed weight will be significantly greater than the actual weight because of the large tension load placed on the seat belt 142.

The tension sensing apparatus 10*a* senses the tension in the seat belt 142. The controller 180 determines a computed weight of the object using the look-up table or calculation method described above. The computed weight will approximate the actual combined weight of the object. The computed weight may, however, differ slightly from the actual weight of the object.

If the tension in the seat belt 142 is above a predetermined value and the computed weight is below a predetermined value, the controller 180 disables the inflator 174 to prevent inflation of the air bag 170. Alternatively, the controller 180 may cause the inflator 174 to direct a minimal amount of inflation fluid to the air bag 170. As a further alternative, the controller 180 may infer the presence of a child safety seat based only on whether the tension on the seat belt 142 is above the predetermined level.

Figure 7:
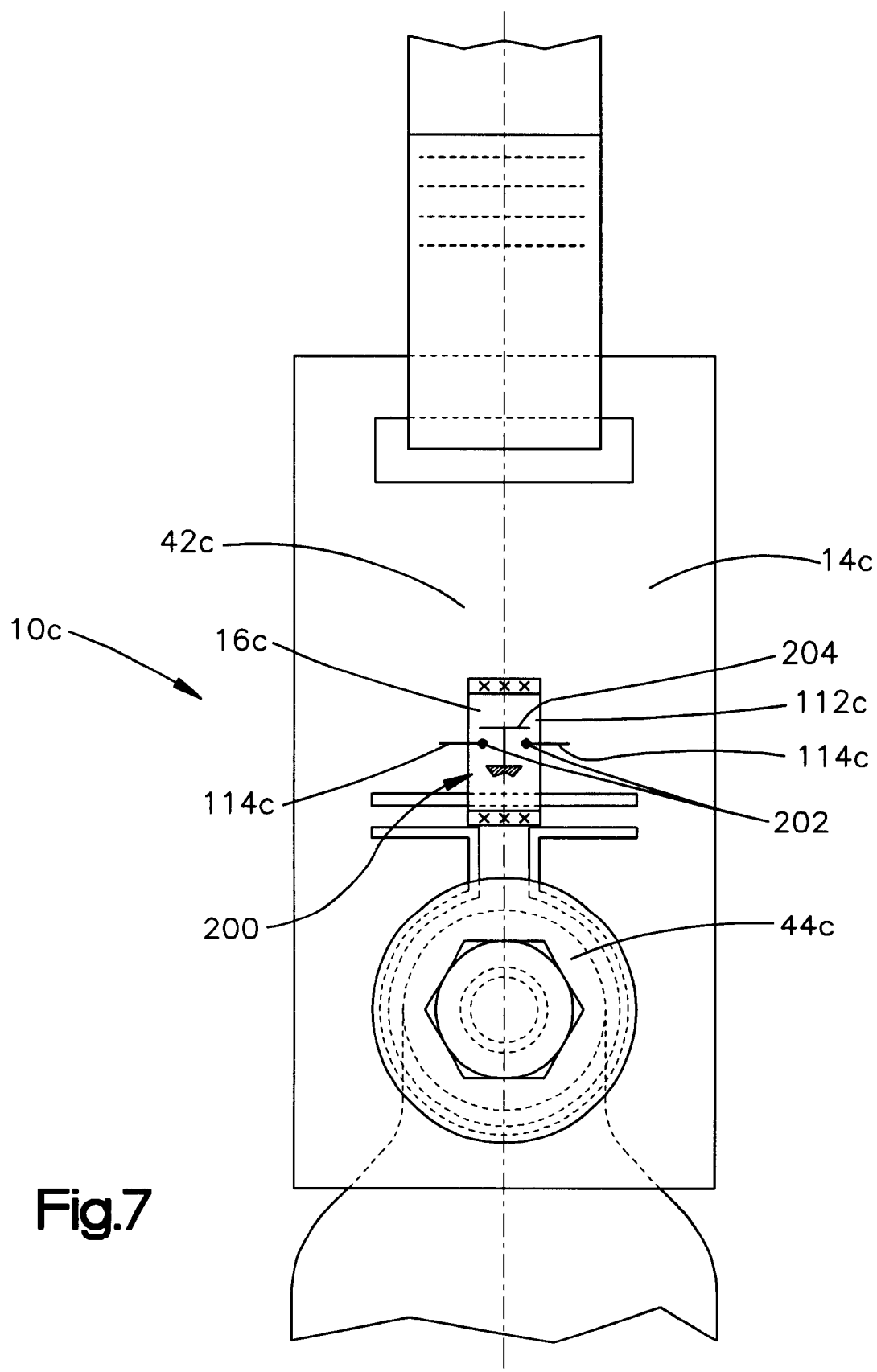
FIG. 7 is a schematic view of a sensor apparatus in accordance with a second embodiment of the present invention.

A second embodiment of the present invention is illustrated in FIG. 7. The second embodiment of the invention is similar to the first embodiment of the invention illustrated in FIGS. 1–3. Accordingly, numerals similar to those of FIGS. 1–3 will be utilized in FIG. 7 to identify similar components, the suffix letter "c" being associated with the numerals of FIG. 7 to avoid confusion. The apparatus 10*c* (FIG. 7) of the second embodiment is identical to the apparatus 10 (FIGS. 1–3), except that the sensor 16*c* (FIG. 7) of the second embodiment is different than the sensor 16 (FIGS. 1–3) of the first embodiment.

In the embodiment illustrated in FIG. 7, the sensor 16*c* comprises a switch 200. The switch 200 is preferably a mechanical switch or micro-switch of a suitable configuration, such as a sliding contact switch. The switch 200 is encapsulated in a protective material 112*c*, such as plastic or polyurethane, in order to isolate and protect the switch from environmental conditions.

Figure 8:
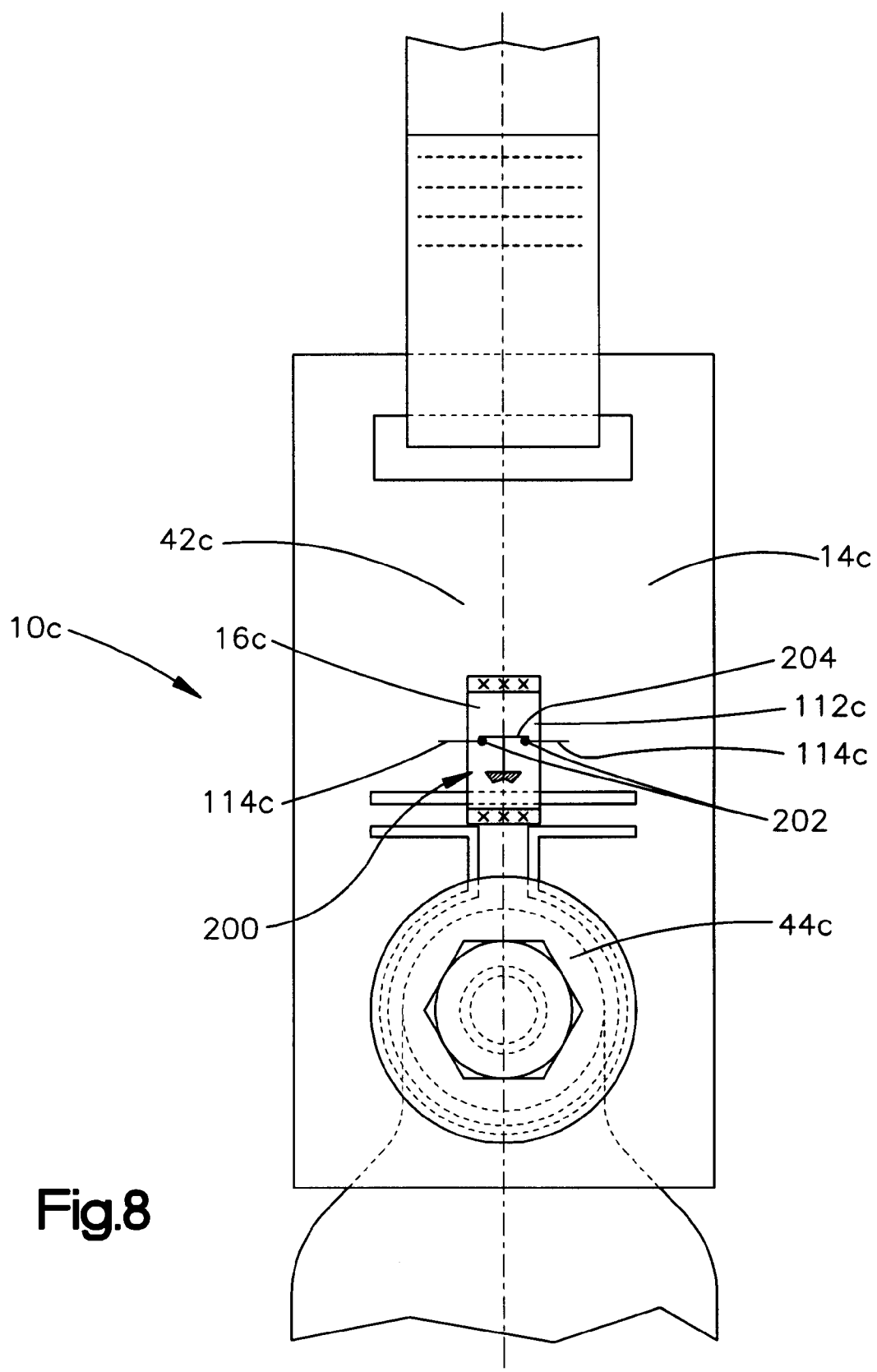
FIG. 8 is a schematic view of the sensor apparatus of FIG. 7 with parts in different positions.

As illustrated in FIG. 7, the switch 200 includes a pair of contacts 202 and a contactor 204. The sensor 16*c* includes a pair of leads 114*c* that protrude from the protective material 112*c*. The leads 114*c* are electrically connected to the contacts 202. The switch 200 is actuatable from a first, unactuated condition, illustrated in FIG. 7, to a second, actuated condition, illustrated in FIG. 8. When the switch 200 is in the actuated condition (FIG. 8), the contactor 204 engages the contacts 202, which establishes electrical continuity between the leads 114c. When the switch 200 is in the unactuated condition (FIG. 7), the contactor 204 is spaced away from the contacts 202, which breaks electrical continuity between the leads 114c.

When a force is applied to the first portion 42c of the member 14c and the first portion 42c of the member 14c moves relative to the second portion 44c, the sensor 16c is stretched or compressed, depending upon the direction of the force. As the sensor 16c is stretched or compressed, the contactor 204 moves relative to the contacts 202. Depending upon the configuration of the switch 200, the contactor 204 may move either toward or away from the contacts 202 when the sensor 16c is stretched or compressed. Also, the switch 200 may be configured normally opened in the unactuated condition or a normally closed in the unactuated condition. These configurations are illustrated in FIGS. 9–12.

Figure 9:
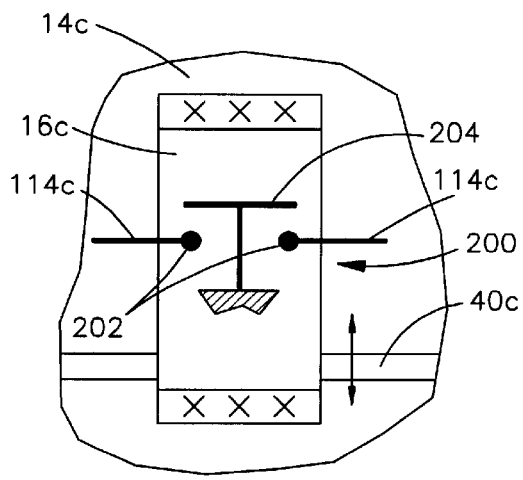
FIGS. 9–12 are schematic views illustrating alternative configurations of the sensor apparatus of FIG. 7.

FIG. 9 illustrates the switch 200 having a normally opened configuration for sensing tension. Tension forces are indicated generally by the arrows in FIG. 9. The switch 200 is illustrated in the unactuated condition. The switch 200 is configured such that the contactor 204 moves towards the contacts 202 when the sensor 16c is stretched and the contactor moves away from the contacts when the sensor is compressed. When the tension on the member 14c reaches a predetermined level, the switch 200 is placed in the actuated condition (not shown), wherein the contacts 202 are closed by the contactor 204 and continuity is established between the leads 114c. When the tension on the member 14c is reduced below the predetermined level or the member is compressed, the contactor 204 moves away from the contacts 202, thus opening the contacts and breaking continuity between the leads 114c.

Figure 10:
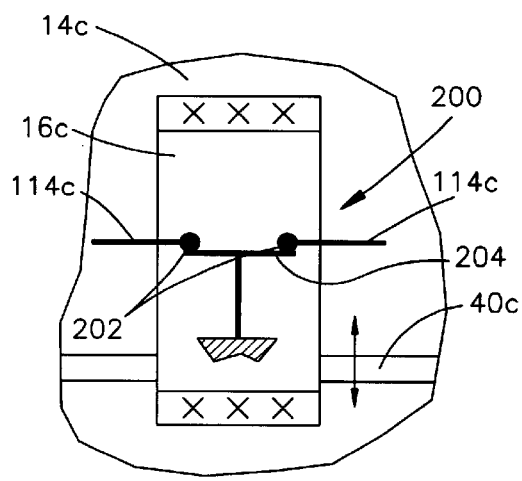

FIG. 10 illustrates the switch 200 having a normally closed configuration for sensing tension. Tension forces are indicated generally by the arrows in FIG. 10. The switch 200 is illustrated in the unactuated condition. The switch 200 is configured such that the contactor 204 moves away from the contacts 202 when the sensor 16c is stretched and the contactor moves towards the contacts when the sensor is compressed. When the tension on the member 14c reaches a predetermined level, the switch 200 is placed in the actuated condition (not shown), wherein the contacts 202 are opened by the contactor 204 and continuity between the leads 114c is broken. When the tension on the member 14c is reduced below the predetermined level or the member is compressed, the contactor 204 moves towards the contacts 202, thus closing the contacts and establishing continuity between the leads 114c.

Figure 11:
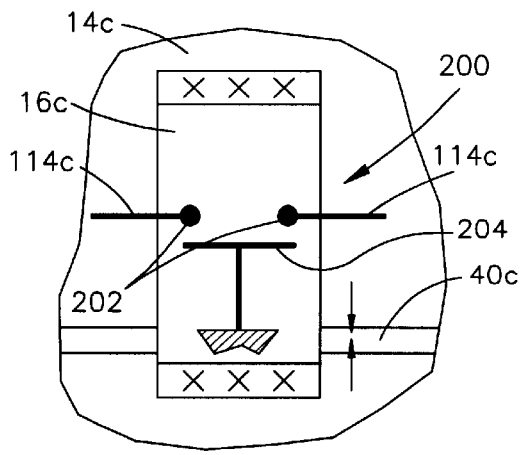

FIG. 11 illustrates the switch 200 having a normally opened configuration for sensing compression. Compressive forces are indicated generally by the arrows in FIG. 11. The switch 200 is illustrated in the unactuated condition. The switch 200 is configured such that the contactor 204 moves towards the contacts 202 when the sensor 16c is compressed and the contactor moves away from the contacts when the sensor is tensioned. When the compression on the member 14c reaches a predetermined level, the switch 200 is placed in the actuated condition (not shown), wherein the contacts 202 are closed by the contactor 204 and continuity is established between the leads 114c. When the compression on the member 14c is reduced below the predetermined level or the member is tensioned, the contactor 204 moves away from the contacts 202, thus opening the contacts and breaking continuity between the leads 114c.

Figure 12:
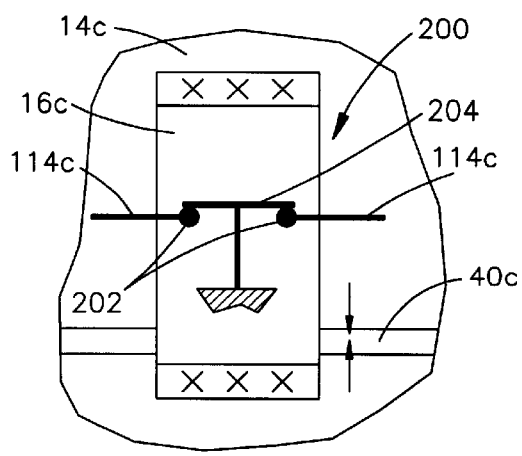

FIG. 12 illustrates the switch 200 having a normally closed configuration for sensing compression. Compressive forces are indicated generally by the arrows in FIG. 12. The switch 200 is illustrated in the unactuated condition. The switch 200 is configured such that the contactor 204 moves away from the contacts 202 when the sensor 16c is compressed and the contactor moves towards the contacts when the sensor is tensioned. When the compression on the member 14c reaches a predetermined level, the switch 200 is placed in the actuated condition (not shown), wherein the contacts 202 are opened by the contactor 204 and continuity between the leads 114c is broken. When the compression on the member 14c is reduced below the predetermined level or the member is tensioned, the contactor 204 moves towards the contacts 202, thus closing the contacts and establishing continuity between the leads 114c.

The sensor 16c can be incorporated into an electrical circuit (not shown) for the purpose of providing indication of the condition of the switch 200. The actuated and unactuated conditions of the switch 200 can be measured by applying an electrical signal to the leads 114c to test for continuity across the contacts 202. Thus, the actuated and unactuated conditions of the switch 200 can be sensed by a known device, such as a microcomputer, and used for a desired purpose, such as for providing data to a controller.

Illustrative of preferred uses of the second embodiment of the present invention, third and fourth apparatuses 10d and 10e, respectively, are incorporated in a vehicle 130 as illustrated in FIG. 4. The third apparatus 10d is installed in the vehicle in a manner identical to the first apparatus 10a of the first embodiment. The fourth apparatus 10e is installed in the vehicle in a manner identical to the second apparatus 10b of the first embodiment. The apparatuses 10d and 10e, however, include a sensor in accordance with the second embodiment, i.e., including a switch 200 (FIGS. 7 and 8), whereas the apparatuses 10a and 10b include a sensor in accordance with the first embodiment, i.e., including a tension sensing device 110 (FIGS. 1–3).

Figure 13:
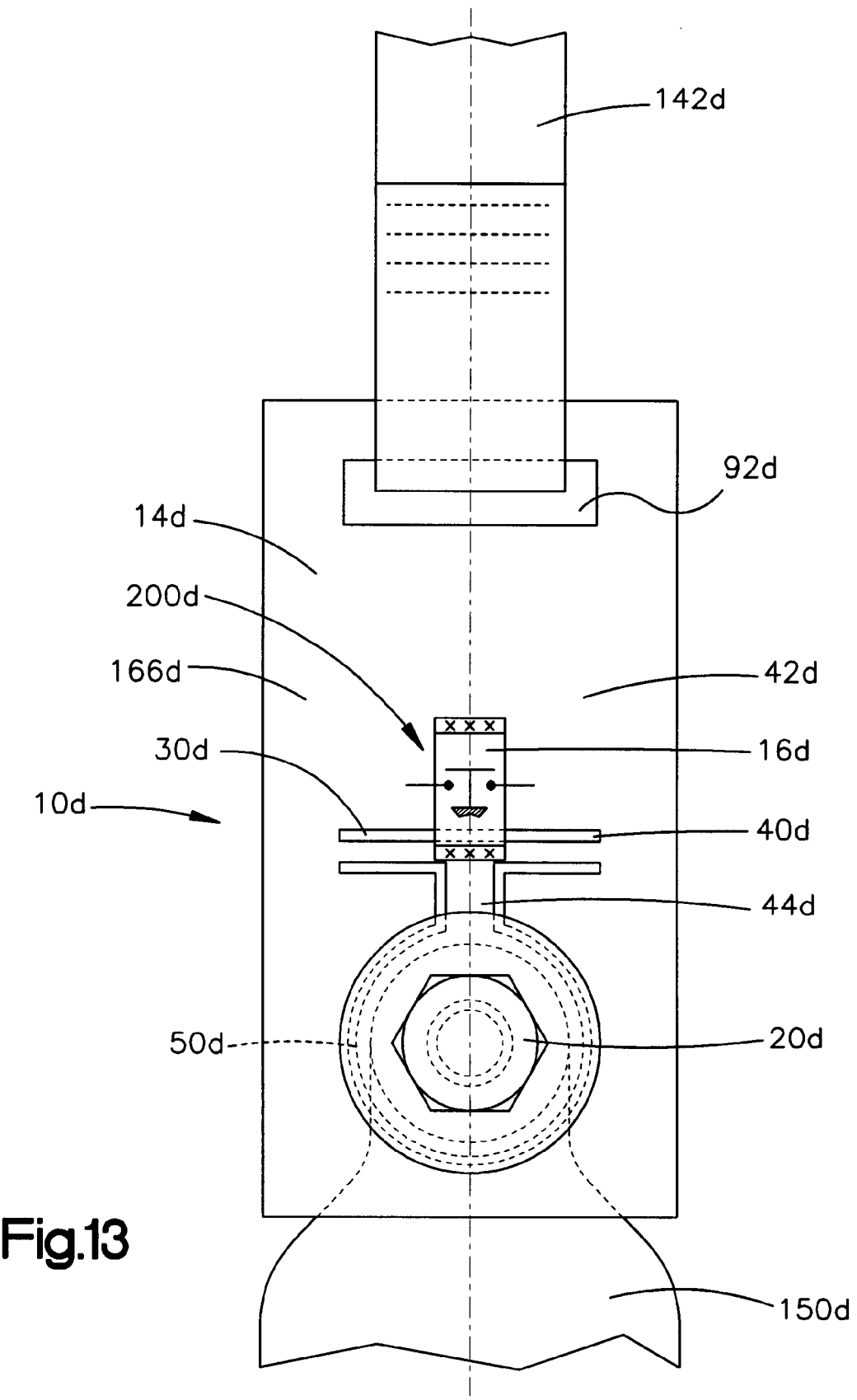
FIG. 13 is an enlarged schematic view of a portion of the vehicle illustrated in FIG. 4 depicting a preferred use of the apparatus of FIG. 7.

As illustrated in FIG. 4, the third apparatus 10d is incorporated into the anchor plate 166 for the seat belt 142. The apparatus 10d is illustrated in FIG. 13. The apparatus 10d is similar to the apparatus 10a illustrated in FIG. 5. Accordingly, numerals similar to those of FIG. 5 will be utilized in FIG. 13 to identify similar components, the suffix letter "d" being associated with the numerals of FIG. 13 to avoid confusion. The apparatus 10d (FIG. 13) is identical to the apparatus 10a (FIG. 5), except that the sensor 16d (FIG. 13) includes a switch 200d in accordance with the second embodiment of the present invention to sense tension in the seat belt 142d of a vehicle 130d.

As illustrated in FIG. 13, the member 14d of the apparatus 10d is the anchor plate 166d for connecting the seat belt 142d to the vehicle body 150d. The seat belt 142d extends through the aperture 92d to connect the seat belt to the anchor plate 166d. The fastener 20d fixedly connects the second portion 44d of the member 14d, i.e., the anchor plate 166d, to the vehicle body 150d.

The switch 200d in the sensor 16d of FIG. 13 has a normally opened configuration for sensing a predetermined amount of tension in the seat belt 142d. When the seat belt 142d is tensioned, a force is applied to the first portion 42d of the anchor plate 166d in the direction and of the magnitude of the tension. The force causes the first portion 42d of the anchor plate 166d to move relative to the second portion 44d of the anchor plate because the second portion is fixedly connected to the vehicle body 150d by the fastener 20d. The anchor plate 166d is oriented such that the force causes the first and second portions 42d and 44d move away from each other across the gap 40d.

As the first and second portions 42d and 44d move away from each other, the width of the gap 40d increases a given distance depending upon the magnitude of the force applied to the anchor plate 166d by the seat belt 142d. Also, as the first and second portions 42d and 44d move away from each other, the sensor 16d is stretched a distance equal to the distance that the width of the gap 40d increases. As the sensor 16d is stretched, tension on the sensor 16d increases. When the tension on the sensor 16d reaches the predetermined amount, the switch 200 is actuated.

Advantageously, the inclusion of the apparatus 10d in the anchor plate 166d provides for the sensing of a relatively low predetermined amount of tension in the seat belt 142d, preferably less than 30 pounds, while maintaining a high tensile strength in the anchor plate. The anchor plate 166d is preferably able to withstand tension loads of greater than three thousand pounds. This combination of high resolution tension sensing capability and high tensile strength is due to the incorporation of the first and second slots 30d and 50d. The first and second slots 30d and 50d allow the first and second portions 42d and 44d to move relative to each other to provide high resolution tension sensing, while maintaining the one-piece construction of the anchor plate 166d, which provides a high tensile strength. Also, placing the sensor 16d on the anchor plate 166d near the floor of the vehicle facilitates covering the sensor with a protective device, such as a boot, to help keep dirt, etc. out of the gap 40d.

Figure 14:
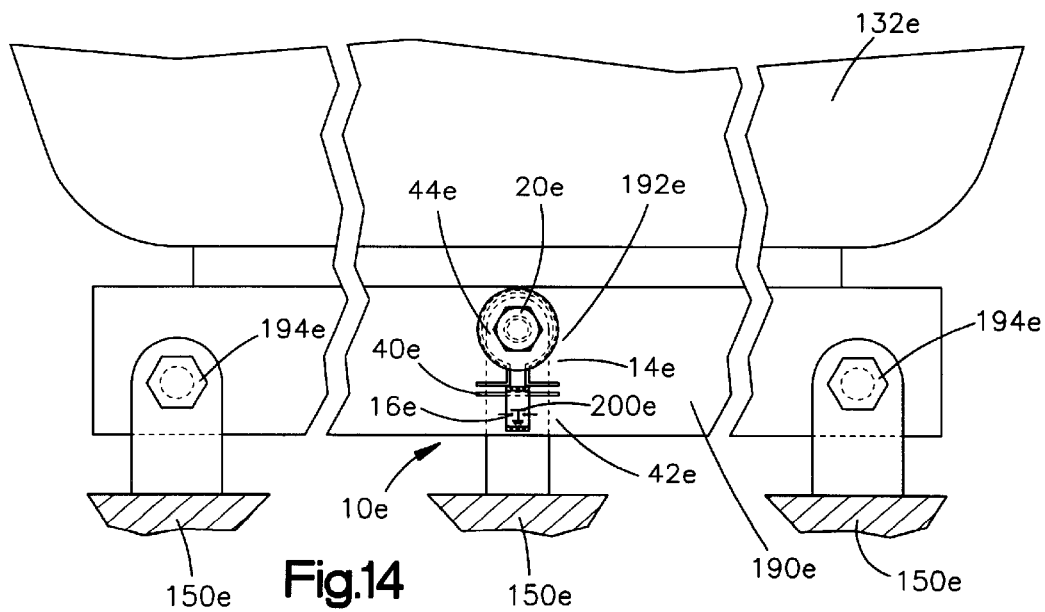
FIG. 14 is an enlarged schematic view of another portion of the vehicle illustrated in FIG. 4 depicting another preferred use of the apparatus of FIG. 7.

As illustrated in FIG. 4, the fourth apparatus 10e is incorporated into the seat frame 190 of the vehicle seat 132. The apparatus 10e is illustrated in FIG. 14. The apparatus 10e is similar to the apparatus 10b illustrated in FIG. 6. Accordingly, numerals similar to those of FIG. 6 will be utilized in FIG. 13 to identify similar components, the suffix letter "e" being associated with the numerals of FIG. 13 to avoid confusion. The apparatus 10e (FIG. 13) is identical to the apparatus 10b (FIG. 6), except that the sensor 16e (FIG. 13) includes a switch 200e in accordance with the second embodiment of the present invention to sense the weight of an object on the vehicle seat 132e.

As illustrated in FIG. 14, the member 14e of the apparatus 10e is incorporated into a portion 192e of the seat frame 190e of the vehicle seat 132e. The seat frame 190e is connected to the vehicle body 150e by fasteners 194e, such as bolts. The fastener 20e fixedly connects the second portion 44e of the member 14e, i.e., the seat frame 190e, to the vehicle body 150e.

When the occupant (not shown in FIG. 14) is seated in the seat 132e, the weight of the occupant applies a force to the first portion 42e of the seat frame 190e. The force causes the first portion 42e of the seat frame 190e to move relative to the second portion 44e of the seat frame because the second portion is fixedly connected to the vehicle body 150e by the fastener 20e. The apparatus 10e is oriented relative to the seat 132e such that the force causes the first and second portions 42e and 44e move away from each other across the gap 40e.

As the first and second portions 42e and 44e move away from each other, the width of the gap 40e increases a given distance depending upon the magnitude of the force applied to the seat frame 190e by the weight of the occupant. Also, as the first and second portions 42e and 44e move away from each other, the sensor 16e, and thus the switch 200e, is stretched a distance equal to the distance that the width of the gap 40e increases. As the sensor 16e is stretched, tension on the sensor increases. When the tension on the sensor 16e reaches the predetermined amount, the switch 200e is actuated.

In accordance with the preferred uses of the second embodiment of the present invention, the controller 180 (FIG. 4) controls the amount of inflation fluid directed into the air bag 170 by the inflator 174. The third apparatus 10d senses when a predetermined amount of tension is on the seat belt 142 and the fourth apparatus 10e senses when a predetermined amount of weight is on the vehicle seat 132. The controller 180 determines the amount of inflation fluid directed into the air bag 170 based upon the presence of the predetermined amount of weight on the seat 132 and the presence of the predetermined amount of tension on the seat belt 142.

During operation of the vehicle, the occupant 144 usually has the tongue 160 connected with the buckle 164. Typically, the amount of tension in the seat belt 142 will be relatively low when the seat belt is used to restrain an occupant 144 seated in the vehicle seat 132. This is because the occupant 144 will typically adjust the seat belt 142 to fit comfortably, rather than tightly, around the occupant's body. If high tension is present, the tension in the seat belt 142 pulls down on the occupant 144, causing the apparatus 10e to be subjected to the weight of the occupant 144 along with the downward force resulting from the tension in the seat belt 142. The apparatus 10e is, thus, subjected to a sensed weight of the occupant 144, which may be greater, although probably only slightly greater, than the actual weight of the occupant.

The apparatus 10d is subjected to the tension in the seat belt 142 and provides an output signal to the controller 180 indicative of whether the tension in the seat belt reaches a predetermined level. The apparatus 10e is subjected to the sensed weight of the occupant 144 on the vehicle seat 132 and provides an output signal to the controller 180 indicative of whether the sensed weight on the seat reaches a predetermined level.

The controller 180 controls the amount of inflation fluid directed to the air bag 170 by the inflator 174 based on whether the sensed weight of the occupant 144 in the seat 132 is above the predetermined value. If the weight of the occupant 144 is below the predetermined value, the controller 180 disables the inflator 174 to prevent inflation fluid from being directed to the air bag 170. Alternatively, if the weight of the occupant 144 is below the predetermined value, the controller 180 may cause the inflator 174 to direct a minimal amount of inflation fluid to the air bag 170.

If the present invention is used in a restraint system for restraining a passenger 144 in a vehicle seat 132 on a passenger side of the vehicle 130, the apparatus 10d and the apparatus 10e may also be used to sense the presence of a low weight object, such as a child safety seat (not shown), in the seat. If a child safety seat is located in the vehicle seat 132, the tongue 160 is connected with the buckle 164 to secure the child safety seat to the seat 132. Typically, the seat belt 142 is pulled as tight as possible to secure the child safety seat to the seat 132. This differs from the instance where an occupant 144 is seated in the seat and the seat belt 142 is fitted comfortably or loosely around the occupant.

The tension in the seat belt 142 pulls down on the child safety seat and causes the weight sensing apparatus 10e to be subjected to the weight of the child safety seat with the child in it and the downward force resulting from the tension in the seat belt. The output signal from the weight sensing apparatus 10*e* is thus subjected to a sensed weight of the child safety seat with the child in it, which is greater than the actual weight of the child safety seat and the child. The sensed weight will be significantly greater than the actual weight because of the large tension load placed on the seat belt 142. The tension sensing apparatus 10*d* senses whether tension on the seat belt 142 reaches a predetermined level.

If the tension in the seat belt 142 is above the predetermined value and the weight on the seat 132 is below the predetermined value, the controller 180 disables the inflator 174 to prevent inflation of the air bag 170. Alternatively, the controller 180 may cause the inflator 174 to direct a minimal amount of inflation fluid to the air bag 170. As a further alternative, the controller 180 may infer the presence of a child safety seat based only on whether the tension on the seat belt 142 is above the predetermined level.

Those skilled in the art will recognize that the apparatuses of the first and second embodiments may be used together. For example, referring to FIG. 4, a sensor 10*b* of the first embodiment, i.e. including a sensor 16*b* (FIG. 6), may be used to sense the amount weight in a vehicle seat while a sensor 10*d* of the second embodiment, i.e. including a switch 200 (FIGS. 7 and 8), may be used to determine when tension in a vehicle seat belt reaches a predetermined level.

From the above description of the invention, those skilled in the art will perceive improvements, changes and modifications. For example, the apparatus 10 has been illustrated as being configured for sensing seat belt tension and for sensing weight in a vehicle seat. The apparatus 10 could, however, be used in other automotive applications or even in non-automotive applications. Such improvements, changes and modifications within the skill of the art are intended to be covered by the appended claims.

Having described the invention, the following is claimed:

1. Apparatus comprising:
    a member having a first slot extending through said member within a periphery of said member, said first slot having opposite ends terminating within said periphery and having opposed spaced surfaces extending between said opposite ends, said surfaces defining a gap having a width measured from one of said opposed surfaces to the other of said opposed surfaces, said member having first and second portions of said member on opposite sides of said first slot, said member being constructed of a single piece of material;
    a sensor having a first end connected to said first portion of said member on one side of said first slot and an opposite second end connected to said second portion of said member on an opposite side of said first slot, said sensor extending across said first slot; and
    means for fixedly connecting said second portion of said member to inhibit movement of said second portion of said member relative to said first portion of said member,
    said first portion of said member moving relative to said second portion when a force is applied to said first portion of said member, said width of said gap changing when said first portion moves relative to said second portion, said sensor providing a signal in response to the change in said gap width.

2. Apparatus as defined in claim 1, wherein said sensor provides said signal in proportion to the amount of change in said gap width.

3. Apparatus as defined in claim 2, wherein said sensor comprises a strain gauge.

4. Apparatus as defined in claim 1, wherein said apparatus is a seat belt tension sensor.

5. Apparatus as defined in claim 4, further including a seat belt of a vehicle, said means for fixedly connecting said second portion of said member being for fixedly connecting said second portion to the vehicle, said seat belt being associated with said first portion, said first portion moving relative to said second portion when said seat belt is tensioned.

6. Apparatus as defined in claim 5, wherein said first portion moves relative to said second portion in proportion to the tension in said seat belt, said sensor providing said signal in proportion to the amount of tension in said seat belt.

7. Apparatus as defined in claim 6, further comprising a controller operatively connected to said sensor, said controller receiving said signal from said sensor.

8. Apparatus as defined in claim 7, wherein said controller is operatively connected to an inflator for providing inflation fluid for inflating an inflatable vehicle occupant protection device, said controller controlling actuation of said inflator in a predetermined manner when said signal is at a predetermined level.

9. Apparatus as defined in claim 8, wherein said controller senses the amount of tension in said seat belt, said controller preventing actuation of said inflator when the tension in said seat belt is at a predetermined level.

10. Apparatus as defined in claim 1, wherein said member further includes a second slot extending through said member within the perimeter of said member and an aperture that extends through said second portion of said member, said second slot extending around said aperture, said aperture receiving said means to connect said second portion fixedly to the vehicle.

11. Apparatus as defined in claim 10, wherein said first portion is movable into abutting engagement with said second portion at a location on said second slot positioned opposite said gap.

12. Apparatus as defined in claim 1, wherein said sensor comprises a switch having a first condition when the width of said gap is less than a predetermined width, said switch being actuated to a second condition when the width of said gap is greater than said predetermined width.

13. Apparatus as defined in claim 12, further including a seat belt of a vehicle, said means for fixedly connecting said second portion of said member being for fixedly connecting said second portion to the vehicle, said seat belt being associated with said first portion, said first portion moving relative to said second portion when said seat belt is tensioned.

14. Apparatus as defined in claim 13, further comprising a controller operatively connected to said switch, said controller receiving a first signal from said switch when said switch is in said first condition, said controller receiving a second signal from said switch when said switch is in said second condition.

15. Apparatus as defined in claim 14, wherein said controller is operatively connected to an inflator for providing inflation fluid for inflating an inflatable vehicle occupant protection device, said controller preventing actuation of said inflator when said controller receives said second signal.

16. Apparatus as defined in claim 1, further including a vehicle seat, said first portion of said member being connected to a frame of said vehicle seat, said means for fixedly connecting said second portion of said member being for fixedly connecting said second portion to the vehicle, said first portion moving relative to said second portion in proportion to the amount of weight supported by said vehicle seat, said sensor providing an output signal in proportion to the amount of weight supported by said vehicle seat.

17. Apparatus as defined in claim 16, wherein said apparatus is a weight sensor.

18. Apparatus as defined in claim 16, wherein said member comprises a portion of said frame of said vehicle seat.

19. Apparatus as defined in claim 18, further comprising a controller operatively connected to said sensor, said controller receiving said signal from said sensor.

20. Apparatus as defined in claim 19, wherein said controller is operatively connected to an inflator for providing inflation fluid for inflating an inflatable vehicle occupant protection device, said controller controlling actuation of said inflator in a predetermined manner when said signal is at a predetermined level.

21. Apparatus as defined in claim 20, wherein said controller senses the amount of weight supported by said vehicle seat, said controller preventing actuation of said inflator when said weight is at a predetermined level.

22. Apparatus as defined in claim 16, wherein said member further includes an aperture that extends through said second portion of said member, said aperture for receiving said means to connect said second portion fixedly to the vehicle.

23. Apparatus as defined in claim 22, wherein said member further includes a second slot extending through said member within the perimeter of said member, said second slot further defining said second portion of said member, said second slot being spaced apart from said first slot and extending around said aperture.

24. Apparatus as defined in claim 1, wherein said single piece of material comprises a single piece of metal.

25. Apparatus as defined in claim 1, wherein said member comprises separate first and second portions constructed of metal, said separate first and second portions being joined together by one of welding and adhesives.

26. Apparatus as defined in claim 1, wherein said means for fixedly connecting comprises a fastener.

27. Apparatus comprising:
   a member having a first slot extending through said member, said first slot having opposed spaced surfaces defining a gap having a width measured from one of said opposed surfaces to the other of said opposed surfaces, said member having first and second portions of said member on opposite sides of said first slot, said member further including a second slot, spaced apart from said first slot, that extends through said member within the periphery of said member, said second slot further defining said second portion of said member;
   a sensor having a first end connected to said first portion of said member on one side of said first slot and an opposite second end connected to said second portion of said member on an opposite side of said first slot, said sensor extending across said first slot; and
   means for fixedly connecting said second portion of said member to inhibit movement of said second portion of said member relative to said first portion of said member,
   said first portion of said member moving relative to said second portion when a force is applied to said first portion of said member, said width of said gap changing when said first portion moves relative to said second portion, said sensor providing a signal in response to the change in said gap width, said first portion being movable into abutting engagement with said second portion at a location on said second slot positioned opposite said gap.

28. Apparatus comprising:
   a member having a first slot extending through said member, said first slot having opposed spaced surfaces defining a gap having a width measured from one of said opposed surfaces to the other of said opposed surfaces, said member having first and second portions of said member on opposite sides of said first slot, said member being constructed of a single piece of material;
   a switch having a first end connected to said first portion of said member on one side of said first slot and an opposite second end connected to said second portion of said member on an opposite side of said first slot, said switch extending across said first slot; and
   means for fixedly connecting said second portion of said member to inhibit movement of said second portion of said member relative to said first portion of said member,
   said first portion of said member moving relative to said second portion when a force is applied to said first portion of said member, said width of said gap changing when said first portion moves relative to said second portion, said switch having a first condition when the width of said gap is less than a predetermined width, said switch being actuated to a second condition when the width of said gap is greater than said predetermined width, said switch providing a signal indicative of whether said switch is in said first condition or said second condition.

29. A seat belt tension sensor for sensing tension in a seat belt of a vehicle, said seat belt tension sensor comprising:
   a member having a first slot extending through said member, said first slot having opposed spaced surfaces defining a gap having a width measured from one of said opposed surfaces to the other of said opposed surfaces, said member having first and second portions of said member on opposite sides of said first slot, said member being constructed of a single piece of material, said second portion being fixedly connected to the vehicle; and
   a sensor having a first end connected to said first portion of said member on one side of said first slot and an opposite second end connected to said second portion of said member on an opposite side of said first slot, said sensor extending across said first slot;
   said first portion being associated with the seat belt such that said first portion is movable relative to said second portion when a force is applied to the seat belt, said width of said gap changing when said first portion moves relative to said second portion, said sensor providing a signal in response to the change in said gap width.

30. Apparatus as defined in claim 29, wherein said member comprises a seat belt anchor plate.

31. A seat weight sensor for sensing an amount of weight placed on a seat of a vehicle, said seat weight sensor comprising:
   a member having a first slot extending through said member, said first slot having opposed spaced surfaces defining a gap having a width measured from one of said opposed surfaces to the other of said opposed surfaces, said member having first and second portions of said member on opposite sides of said first slot, said member being constructed of a single piece of material, said second portion being fixedly connected to the vehicle; and a sensor having a first end connected to said first portion of said member on one side of said first slot and an opposite second end connected to said second portion of said member on an opposite side of said first slot, said sensor extending across said first slot;

said first portion being associated with the vehicle seat such that said first portion is movable relative to said second portion when a weight is placed on the seat, said width of said gap changing when said first portion moves relative to said second portion, said sensor providing a signal in response to the change in said gap width.

32. Apparatus as defined in claim 31, wherein said member comprises a frame member of the seat.

33. Apparatus comprising:

a seat belt;

a member having a first slot extending through said member, said first slot having opposed spaced surfaces defining a gap having a width measured from one of said opposed surfaces to the other of said opposed surfaces, said member having first and second portions of said member on opposite sides of said first slot, said second portion being fixedly connectable to the vehicle; and a sensor having a first end connected to said first portion of said member on one side of said first slot and an opposite second end connected to said second portion of said member on an opposite side of said first slot, said sensor extending across said first slot;

said first portion being associated with said seat belt such that said first portion is movable relative to said second portion when a force is applied to the seat belt, said width of said gap changing when said first portion moves relative to said second portion, said sensor providing a signal in response to the change in said gap width.

34. Apparatus comprising:

a vehicle seat including a seat frame member, a first slot extending through said seat frame member, said first slot having opposed spaced surfaces defining a gap having a width measured from one of said opposed surfaces to the other of said opposed surfaces, said member having first and second portions of said member on opposite sides of said first slot, said second portion being fixedly connectable to the vehicle; and a sensor having a first end connected to said first portion of said seat frame member on one side of said first slot and an opposite second end connected to said second portion of said seat frame member on an opposite side of said first slot, said sensor extending across said first slot;

said first portion being movable relative to said second portion when a weight is placed on the seat, said width of said gap changing when said first portion moves relative to said second portion, said sensor providing a signal in response to the change in said gap width.

\* \* \* \* \*